United States Patent Office 3,567,713
Patented Mar. 2, 1971

3,567,713
DERIVATIVES OF 2α,3α-EPITHIOANDROSTANE
AND PROCESS FOR PREPARING THEM
Taichiro Komeno, Osaka-shi, Japan, assignor to
Shionogi & Co., Ltd., Osaka, Japan
No Drawing. Filed Jan. 26, 1968, Ser. No. 700,719
Claims priority, application Japan, Jan. 28, 1967,
42/5,718
Int. Cl. C07c 173/00
U.S. Cl. 260—239.5        10 Claims

ABSTRACT OF THE DISCLOSURE

Hormonal (anabolic, myogenic, androgenic, uterotropic, antiuterotropic, antiestrogenic, contragestive, etc.) 17β - (1 - alkoxycycloalkyl)oxy - 2α,3α-epithio-5α-androstanes, for enteral and parenteral administration, pharmaceutical preparations containing one or more of them and process for preparing those compounds.

The present invention relates to new derivatives of 2α, 3α-epithiosteroids. More particularly, it relates to 17β-(1-alkoxycycloalkyl)oxy-2α,3α-epithio-5α-androstanes, process for preparing them, and medicaments containing one or more of the compounds of the present invention.

The compounds of the present invention may inclusively be represented by general formula:

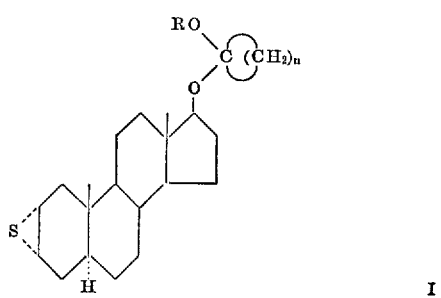

wherein R represents a lower alkyl group, and $n$ represents an integer from 4 to 6.

An object of the present invention is to provide compounds represented by general Formula I. Another object of the present invention is to provide a process for preparing compounds of the present invention. Further objects of the present invention is to provide pharmacologically active substances. Furthermore, the present invention provides useful medicaments for human and veterinary use. These and other objects are realized by the invention as hereinafter disclosed.

The compounds of the present invention are represented by the above general Formula I. The substituent at position 17β of the steroid moiety of the molecule is an unsymmetrical ketal of a cycloalkanone, such as cyclopentanone, cyclohexanone and cycloheptanone. The lower alkyl group of the hemiketal group represented by R in the Formula I is exemplified by methyl, ethyl, propyl, butyl, 3-methylbutyl group and pentyl. 2α,3α-epithio-5α-androstan-17β-ol which provides the steroid moiety of the compounds I, is a known compound useful for its high physiological activities (e.g. K. Takeda, T. Komeno et al., Tetrahedron, 21, 329 (1965)).

Specific examples of novel compounds of the present invention include:

17β-(1methoxycyclopentyl)oxy-2α,3α-epithio-5α-
 androstane
17β-(1-ethoxycyclopentyl)oxy-2α,3α-epithio-5α-
 androstane
17β-(1-propoxycyclopentyl)oxy-2α,3α-epithio-5α-
 androstane
17β-(1-butoxycyclopenyl)oxy-2α,3α-epithio-5α-
 androstane
17β-(1-pentyloxycyclopentyl)oxy-2α,3α-epithio-5α-
 androstane
17β-(1-methoxycyclohexyl)oxy-2α,3α-epithio-5α-
 androstane
17α-(1-ethoxycyclohexyl)oxy-2α,3α-epithio-5α-
 androstane
17β-(1-propoxycyclohexyl)oxy-2α,3α-epithio-5α-
 androstane
17β-(1-butoxycyclohexyl)oxy-2α,3α-epithio-5α-
 androstane
17β-(1-isobutyloxycyclohexyl)oxy-2α,3α-epithio-5α-
 androstane
17β-(1-pentyloxycyclohexyl)oxy-2α,3α-epithio-5α-
 androstane
17β-(1-methoxycycloheptyl)oxy-2α,3α-epithio-5α-
 androstane
17β-(1-ethoxycycloheptyl)oxy-2α,3α-epithio-5α-
 androstane
17β-(1-pentyloxycycloheptyl)oxy-2α,3α-epithio-5α-
 androstane and the like.

The process of the present invention comprises reacting a compound of formula:

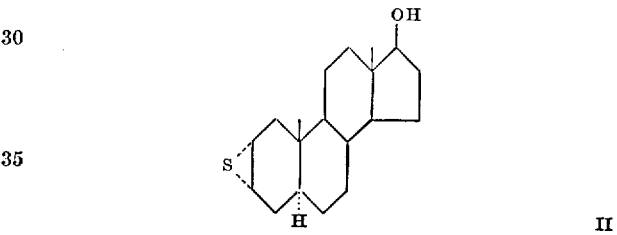

with a derivative of cycloalkanone represented by the general formula:

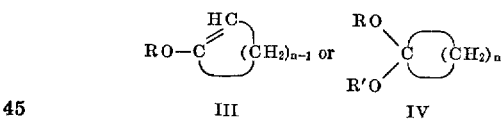

wherein R and $n$ have the same significances as above and R′ is lower alkyl, in the presence of a minor amount of acid catalyst, to obtain the compounds of the present invention. As described above, the starting material represented by Formula II is a known useful compound. The other starting material, represented by general Formula III or IV, is dialkyl ketal (Compound IV) or enol alkyl ether (Compound III) of a cycloalkanone. A few examples of these compounds are:

1,1-dimethoxycyclopentane
1,1-diethoxycyclopentane
1,1-dipropoxycyclopentane
1,1-dibutoxycyclopentane
1,1-dipentyloxycyclopentane
1-methoxy-1-ethoxycyclopentane
1,1-dimethoxycyclohexane
1,1-diethoxycyclohexane
1,1-dipropoxycyclohexane
1,1-dibutoxycyclohexane
1,1-dipentyloxycyclohexane
1-methoxy-1-propoxycyclohexane
1,1-dimethoxycycloheptane
1,1-diethoxycycloheptane
1,1-dipropoxycycloheptane
1,1-dibutoxycycloheptane
1,1-dipentyloxycycloheptane 1-methoxycyclopentene
1-ethoxycyclopentene
1-propoxycyclopentene
1-butoxycyclopentene
1-pentyloxycyclopentene
1-methoxycyclohexene
1-ethoxycyclohexene
1-propoxycyclohexene
1-butoxycyclohexene
1-γ-methylbutoxycyclohexene
1-pentyloxycyclohexene
1-methoxycycloheptene
1-ethoxycycloheptene
1-propoxycycloheptene
1-butoxycycloheptene
1-pentyloxycycloheptene
and the like.

As for the acid catalyst added to the reaction medium, there is exemplified an organic acid such as formic acid, acetic acid, oxalic acid, methanesulfonic acid, ethanesulfonic, p-toluenesulfonic acid, benzenesulfonic acid, benzoic acid, cation exchange resins, or the like, an inorganic acid such as hydrochloric acid, hydrobromic acid, sulfuric acid, selenous acid, selenium dioxide or the like, or the salts of these organic or inorganic acids with a weak base such as pyridine, collidine, ammonia or the like. The reaction may be carried out in an inert solvent. For example, the applicable solvent is exemplified by alcohols such as methanol, ethanol, propanol, butanol, tert-butanol, tert-amyl alcohol or sec-butanol, haloalkanes such as dichloromethane, chloroform or carbon tetrachloride, ethers such as diethyl ether, tetrahydrofuran or dioxane, hydrocarbons such as benzene, toluene, xylene or ligroin, aromatic bases such as pyridine, collidine, quinoline or the like, or other solvents such as dimethylformamide, dimethylsulfoxide, ethyl acetate, dialkoxycycloalkane, 1-alkoxycycloalkene, etc., and the mixtures of the solvents cited above. Usually, the reaction is carried out at a temperature between 0° C. to 100° C. Instability of the epithio group, located at the position 2α,3α of the steroid nucleus of the molecule, to acids and to heat usually requires sufficiently mild reaction conditions. If required, the reaction may be carried out in an atmosphere of an inert gas such as nitrogen or helium to exclude moisture or oxygen. When desirable, the alcohols formed in the reaction may be removed by azeotropic distillation during the reaction. The reaction is generally completed within 10 hours. When the reaction is carried out in a primary alcohol, an exchange reaction of the acetal group may take place and form a compound having the group R identical with alkyl moiety of the solvent. The product thus obtained may be isolated in per se conventional manner such as successive treatment of the reaction mixture by neutralization of catalyst, evaporation of solvent, extraction, washing, drying, etc., or dilution of the reaction mixture with water, removal of the solvent by filtration, drying, etc., or combination of these procedures, and purified by absorption and elution, chromatography, recrystallization, treatment with absorbent and the like.

The compounds I have valuable pharmacological activities. For example, they are all useful agents for regulation of physiological functions as evidenced by their anabolic activity, myogenic activity, androgenic activity, uterotropic activity or antiuterotropic activity, antiestrogenic activity, etc., or for medical activity such as contragestive activity, etc. They are characterized by increase in the ratio of the major activities, namely anabolic activity/androgenic activity. These compounds have also advantage over the starting material (Compound II) as they can effectively be administered through the digestive organ. For example, oral administration of 17β-(1-methoxycyclohexyl)oxy - 2α,3α - epithio - 5α-androstane (Compound A) or 17β-(1-methoxycyclopentyl)oxy-2α,3α-epithio-5α-androstane (Compound B) in sesame oil shows that these compounds are 10 to 30 times as active as the anabolic activity of methyltestosterone and 4 to 5 times as active as the androgenic activity of methyltestosterone. Hence, the ratio of anabolic activity/androgenic activity is improved up to 3 to 10 times as that of methyltestosterone. Further, the Compound B significantly inhibits the growth of estrogen stimulated uterus and mammary gland at a dose of more than 30γ per mouse, and the Compound A blocks completely the pregnancy of rats at a dose of 6 mg. per rat, when injected subcutaneously.

These activities indicate that the compounds of the present invention are useful for human, poultry and veterinary medicaments or additives to foodstuffs or baits in a manner per se conventional in the art. For example, they may be utilized for treatment of malnutrition, recovery from emaciation, convalescence, senility, wasting diseases and disorders of nutrition, promotion of growth of immature infant, promotion of granulation and protein metabolism, increase in body weight, stimulation of appetite, and for treatment of diseases or conditions demanding anabolic agents or for implantation inhibition, mastopathy, endometriosis, regulation of conception, corpulency, etc., for humans, veterinary, and poultry use at a dose of 1γ to 500 mg. per kilogram of body weight for a day. These compounds may be utilized in a wide variety of oral or parenteral dosage forms, solely or in admixture with other co-acting compounds. They can be administered with a pharmaceutical carrier which can be a solid material or a liquid in which the compound is dissolved, dispersed or suspended. The solid compositions can take the form of tablets, powders, granules, capsules, pills or the like. The liquid composition may take the form of injections, ointments, suspensions, solutions, emulsions, syrups or elixirs. They may be flavored, colored, and tablets and granules may be coated.

The following examples are given by way of illustration only and are not intended as limitations of the present invention, many apparent variations of which are possible without departing from the spirit and scope thereof. The abbreviations have the conventional meanings.

EXAMPLE 1

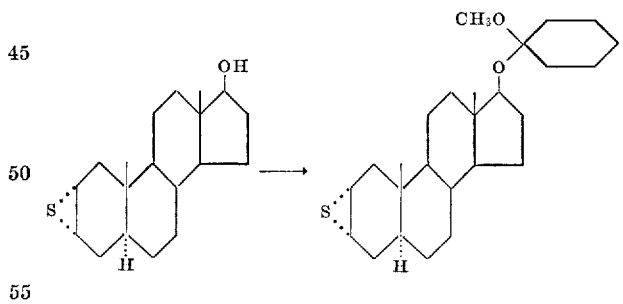

A suspension of 850 mg. of 2α,3α-epithio-5α-androstan-17β-ol in 8 ml. tert-butanol has added thereto 1 ml. of 1-methoxycyclohexene and 13 mg. of pyridine salt of p-toluenesulfonic acid and the mixture is stirred for 4 hours at room temperature. The reaction mixture is poured into an aqueous solution of sodium carbonate and the whole extracted with dichloromethane. The extract is dried over anhydrous sodium sulfate and evaporated to remove solvent. Purification of the residue by chromatography over alumina gives 846 mg. of 17β-(1-methoxycyclohexyl)oxy - 2α,3α - epithio - 5α - androstane. Yield 72.9%. M.P. 102–103.5° C. $[\alpha]_D^{25} + 30.0 \pm 0.8°$ (c.=0.875, chloroform).

IR $\nu_{max}^{Nujol}$: 1342, 1157, 1098, 1052, 1028, 926, 822 cm.$^{-1}$

Analysis.—Calcd. for $C_{26}H_{42}O_2S$ (percent): C, 74.59; H, 10.11; S, 7.66. Found (percent): C, 74.60; H, 10.02; S, 7.89.

EXAMPLE 2

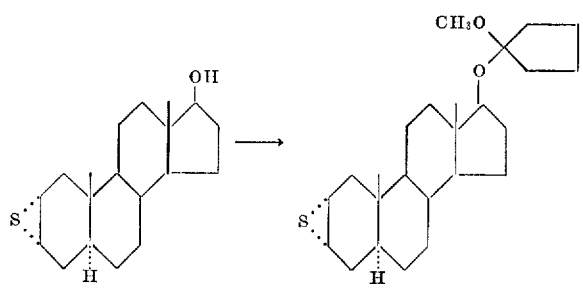

A mixture of 1.759 g. of 2α,3α-epithio-5α-androstan-17β-ol, 2.3 ml. of 1-methoxycyclopentene, 20 mg. of pyridine salt of p-toluenesulfonic acid and 20 ml. of tert-butanol is treated after the manner set forth in Example 1 to give 1.487 g. of 17β-(1-methoxycyclopentyl)oxy-2α,3α-epithio-5α-androstane. Yield 68.2%. M.P. 98–101° C. $[\alpha]_D^{20} + 22.5 \pm 0.5°$ (c.=1.000, chloroform).

IR $\nu_{max}^{Nujol}$: 1330, 1184, 1117, 1109, 1102, 1054 cm.$^{-1}$

Analysis.—Calcd. for $C_{25}H_{40}O_2S$ (percent): C, 74.20; H, 9.96; S, 7.93. Found (percent): C, 74.28; H, 9.90; S, 7.95.

EXAMPLE 3

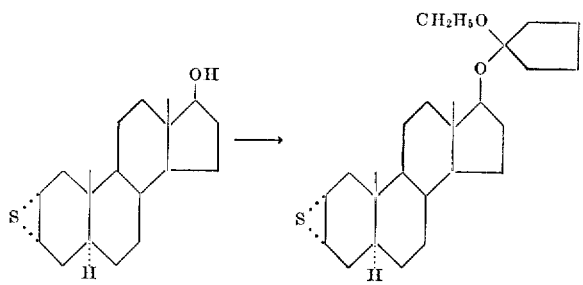

A solution of 1.0 g. of 2α,3α-epithio-5α-androstan-17β-ol in 40 ml. of methylene chloride has added thereto 2.7 ml. of 1,1-diethoxycyclopentane and 10 mg. of pyridine salt of p-toluenesulfonic acid. The mixture is warmed for six hours on a water bath (bath temperature 50° C.) with azeotropic distillation while adding gradually 40 ml. of methylene chloride. After the addition of ten drops of pyridine to the reaction mixture, the latter is evaporated under reduced pressure. Purification of the residue by chromatography over alumina gives 799 mg. of pure 17β-(1-ethoxycyclopentyl)oxy - 2α,3α - epithio-5α-androstane. Yield 57.0%. M.P. 88–92° C. $[\alpha]_D^{24} + 24.0 \pm 0.7°$ (c.=0.935, chloroform).

IR $\nu_{max}^{Nujol}$: 1333, 1117, 1101, 1056, 986 cm.$^{-1}$

Analysis.—Calcd. for $C_{26}H_{42}O_2S$ (percent): C, 74.59; H, 10.11; S, 7.66. Found (percent): C, 74.48; H, 10.10; S, 7.92.

EXAMPLE 4

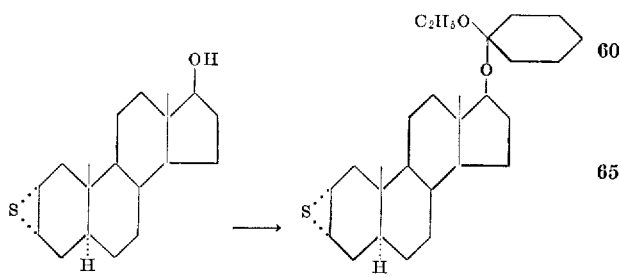

A mixture of 1.0 g. of 2α,3α-epithio-5α-androstan-17β-ol, 3.1 ml. of 1,1-diethoxycyclohexane, 10 mg. of pyridine salt of p-toluenesulfonic acid and 40 ml. of methyl chloride is treated after the manner set forth in Example 3 to afford 1.135 g. of 17β-(1-ethoxycyclohexyl)oxy-2α,3α-epithio-5α-androstane. Yield 80.5%. M.P. 115–117° C. $[\alpha]_D^{24} + 33.6 \pm 0.8°$ (c.=0.918, chloroform).

IR $\nu_{max}^{Nujol}$: 1333, 1160, 1151, 1090, 1073, 1059, 1050, 1033, 969, 953, 852, 826 cm.$^{-1}$ Analysis.—Calcd. for $C_{27}H_{44}O_2S$ (percent): C, 74.94; H, 10.25; S, 7.41. Found (percent): C, 74.88; H, 10.26; S, 7.49.

EXAMPLE 5

In a manner similar to that of Example 1 or 3, 2α,3α-epithio-5α-androstan-17β-ol is reacted with 1,1-dipropoxycyclopentane, 1,1-dipropoxycyclohexane, 1-methoxycycloheptene, 1,1-diethoxycycloheptene or 1-pentyloxycycloheptene to afford 17β-(1-propoxycyclopentyl)oxy-2α,3α-epithio-5α-androstane, 17β - (1 - propoxycyclohexyl)oxy-2α,3α-epithio-5α-androstane, 17β-(1-methoxycycloheptyl)oxy-2α,3α-epithio-5α-androstane, 17β - (1 - ethoxycycloheptyl)oxy-2α,3α-epithio-5α-androstane or 17β-(1-pentyloxycycloheptyl)oxy-2α,3α-epithio-5α-androstane, respectively.

EXAMPLE 6

A solution in oil for intramuscular injection, composed of 10 mg. of 17β - (1 - methoxycyclopentyl)oxy - 2α,3α-epithio-5α-androstane in 1 ml. of anhydrous sesame oil is prepared by sterilized procedure and administered once or twice a week to a patient, e.g. a woman in childbed.

EXAMPLE 7

A capsule, containing a solution of 2.5 mg. 17β-(1-ethoxycyclopentyl)oxy-2α,3α-epithio - 5α - androstane in 0.25 ml. of anhydrous sesame oil or isopropyl myristate and a stabilizer, is given orally three times a day to a patient who is suffering e.g. from malnutrition.

EXAMPLE 8

A tablet is prepared in per se conventional manner from 5 mg. of 17β - (1 - ethoxycyclohexyl)oxy - 2α,3α-epithio-5α-androstane, 50 mg. of calcium carbonate, 10 mg. of starch and a small amount of magnesium stearate and coated enterically. The tablet is administered e.g. to a patient in senility.

EXAMPLE 9

Sterilized microcrystals of 10 mg. of 17β-(1-methoxycyclohexyl)oxy-2α,3α-epithio-5α-androstane in a vial is suspended with physiological saline, when it is to be injected, e.g. to an immature infant.

Having thus disclosed the invention, what is claimed is:

1. A compound of the formula:

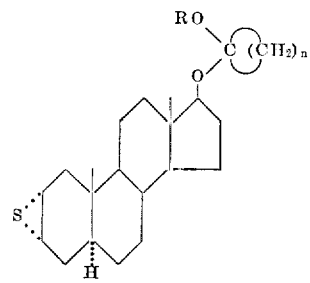

wherein R is lower alkyl and n is an integer from 4 to 6, inclusive.

2. A compound according to claim 1, namely 17β-(1-methoxycyclopentyl)oxy-2α,3α-epithio-5α-androstane.

3. A compound according to claim 1, namely 17β-(1-ethoxycyclopentyl)oxy-2α,3α-epithio-5α-androstane.

4. A compound according to claim 1, namely 17β-(1-propoxycyclopentyl)oxy-2α,3α-epithio-5α-androstane.

5. A compound according to claim 1, namely 17β-(1-methoxycyclohexy)oxy-2α,3α-epithio-5α-androstane.

6. A compound according to claim 1, namely 17β-(1-ethoxycyclohexyl)oxy-2α,3α-epithio-5α-androstane.

7. A compound according to claim 1, namely 17β-(1-propoxycyclohexyl)oxy-2α,3α-epithio-5α-androstane.

8. A compound according to claim 1, namely 17β-(1-methoxycycloheptyl)oxy-2α,3α-epithio-5α-androstane.

9. A compound according to claim 1, namely 17β-(1-ethoxycycloheptyl)oxy-2α,3α-epithio-5α-androstane.

10. A compound according to claim 1, namely 17β-(1-pentyloxycycloheptyl)oxy-2α,3α-epithio-5α-androstane.

References Cited
UNITED STATES PATENTS 3,301,850   1/1967   Klimstra.

OTHER REFERENCES

Ercoli et al.: Chem. & Ind., July 1962, pp. 1285–85.

HENRY A. FRENCH, Primary Examiner

U.S. Cl. X.R.

424—241